Nov. 30, 1926.

S. MOORE

SELF DIRECTING HEADLIGHT

Filed Dec. 12, 1925

1,608,903

Inventor

S. Moore

By Lacey & Lacey, Attorneys

Patented Nov. 30, 1926.

1,608,903

UNITED STATES PATENT OFFICE.

SAM MOORE, OF GRANTTOWN, WEST VIRGINIA, ASSIGNOR, BY DIRECT AND MESNE ASSIGNMENTS, OF SEVEN-EIGHTEENTHS TO ALVIN L. ANDERSON, OF GRANTTOWN, WEST VIRGINIA, AND ONE-NINTH TO WILLIAM MILLER, OF FAIRMONT, WEST VIRGINIA.

SELF-DIRECTING HEADLIGHT.

Application filed December 12, 1925. Serial No. 75,014.

The invention relates to headlights, designed chiefly for mechanically propelled cars and more particularly for electrically operated interurban cars, and has for its principal purpose to pivotally mount the headlight and connect it with the front truck to turn therewith, so as to illuminate the track ahead of the car when negotiating curves, thereby materially reducing the chances of casualties both to the car and to pedestrians and drivers of vehicles on roads crossing the track.

The invention furthermore aims to mount the headlight to admit of its receiving a limited pivotal movement which is less than the pivotal movement of the truck to which it is connected for movement therewith, this being accomplished by a yieldable connection between the truck and headlight.

While the drawings illustrate a preferred embodiment of the invention it is to be understood that in adapting the means to meet specific needs and requirements the design may be varied, and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1:
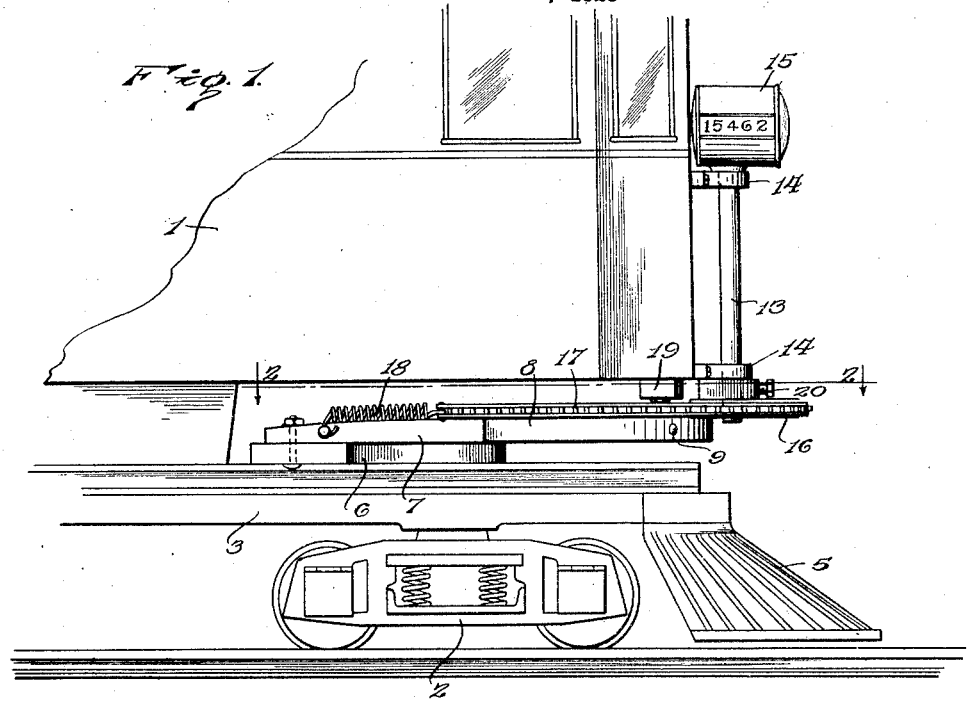
Figure 2:
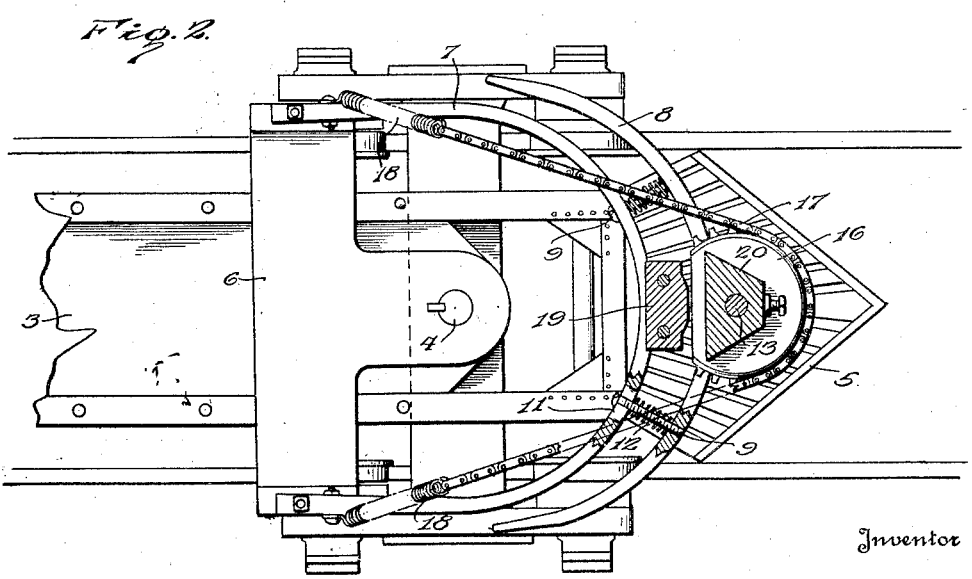

Figure 1 is a fragmentary side view of the front portion of a street car provided with a dirigible headlight embodying the invention, and Figure 2 is a detail sectional view on the line 2—2 of Figure 1.

Corresponding and like parts are referred to in the following description and designated in both views of the drawings by like reference characters.

The numeral 1 designates the body of a street car and 2 the front truck which is connected to the substructure 3 by means of a pivot fastening or king bolt 4. The usual pilot 5 is connected to the substructure 3 which is fixed. A T-member 6 is connected to the upper end of the pivot or king bolt 4 so as to turn therewith and a curved bar 7 is connected at its ends to the cross piece of the T-member 6. A bumper 8 is yieldably connected to the curved bar 7 and consists of a curved bar to which bolts or headed guide pins 9 are attached and pass through slots 11 formed in the curved bar 7, coil springs 12 being mounted upon the elements 9 and interposed between the curved bars 7 and 8. Binding of the guides 9 in the slots 11 is prevented by being radially disposed and passing through elongated openings forming the slots 11.

A post 13, disposed in front of the car and mounted in bearings 14, is provided at its upper end with a headlight 15 which is connected with the post 13 to move therewith. A mutilated sprocket gear 16 is fast to the lower end of the post 13 and a sprocket chain 17 passes around the sprocket gear 16 and is yieldably connected at its ends to the crosspiece of the T-member 6 by springs 18 which are of usual form and of sufficient strength to withstand the strain and stress.

From the foregoing, taken in connection with the accompanying drawings, it will be readily understood that when the car is passing around a curve the truck 2 turns to accommodate itself to the curvature of the track and, since the member 6 is connected to the truck to turn therewith, the sprocket chain 17 receives a movement which effects a rotary movement of the sprocket gear 16 and the post 13, thereby causing the headlight 15 to turn and throw the rays of light upon the track ahead of the car, with the result that the track is illuminated and thereby reduces the chances for accident which is usually attributable to insufficient light after dark. To limit the turning movement of the post and the headlight carried thereby, a cross piece 19 is attached to the car body and a corresponding member 20 is attached to the post 13 and these members 19 and 20 constitute stop means to limit the turning of the post 13 in each direction and by reason of the springs 18 the truck 2 may continue to turn after the turning of the headlight has been arrested by the stop members 19 and 20. This arrangement prevents the turning of the headlights too far in each direction.

Having thus described the invention, I claim:

1. The combination with a car including a truck connected to the substructure by means of a king bolt, of a cross piece connected to the upper end of the king bolt above the substructure, a post pivotally mounted in front of the car, a headlight fixed to the upper end of the post, a sprocket gear fast to the lower end of the post, a sprocket chain passing around the sprocket gear, springs connecting the ends of the sprocket chain to the ends of the said cross piece, a stop member secured to the car and a companion stop member secured to the said post and projecting beyond opposite sides thereof to coact with the stop member on the car to limit the pivotal movements of the post.

2. The combination with a car including a truck connected to the substructure by means of a king bolt, of a cross piece connected to the upper end of the king bolt above the substructure, a curved bar attached at its ends to opposite ends of the cross piece, a second curved bar disposed forwardly of the first mentioned curved bar and yieldably connected thereto, a headlight pivotally mounted upon the car and connecting means between the headlight and the said cross piece.

In testimony whereof I affix my signature.

SAM MOORE. [L. S.]